United States Patent

Berman

[15] 3,658,153

[45] Apr. 25, 1972

[54] LUBRICATING OIL SYSTEM FOR A PRIME MOVER

[72] Inventor: Paul A. Berman, Plymouth Meeting, Pa.

[73] Assignee: Westinghouse Electric Corporation, Pittsburgh, Pa.

[22] Filed: Nov. 28, 1969

[21] Appl. No.: 880,843

[52] U.S. Cl. ............................184/6.3, 184/6.4, 184/104 R
[51] Int. Cl. ..........................................................F01m 7/00
[58] Field of Search ..................60/39.08; 184/6, 6 A, 6 D, 184/6 GE, 6 TS, 6 F, 103, 104, 6 L; 123/196 A

[56] References Cited

UNITED STATES PATENTS

| 1,553,149 | 9/1925 | Doran | 184/6 |
| 1,904,412 | 4/1933 | Clouse | 184/6 |
| 2,377,543 | 6/1945 | Cutler | 184/103 UX |
| 2,602,583 | 7/1952 | Haeberlein | 184/6 X |
| 2,711,071 | 6/1955 | Frankel | 60/39.08 X |
| 3,030,529 | 4/1962 | Jaeschke et al. | 184/6 X |
| 3,451,214 | 6/1969 | Bradley | 60/39.08 X |

Primary Examiner—Manuel A. Antonakas
Attorney—A. T. Stratton, F. P. Lyle and F. Cristiano, Jr.

[57] ABSTRACT

A lubricating oil system for an internal combustion prime mover having an oil pump driven by the prime mover shaft and an electrically driven oil pump arranged in series flow relation with the prime mover shaft bearings for pumping hot oil from the bearings through an oil cooler and into a main reservoir during normal operation. A drain tank is disposed between the bearings and the main reservoir and in communication with the reservoir above the normal oil level. During a "black start" when no power is available to drive the electrical pump and the oil cooler fan, the shaft driven pump is effective to pump cool oil from the main reservoir to the bearings and the thus-heated oil from the bearings to the drain tank without immediately returning the heated oil to the reservoir. Several "starts" are thus permitted before the oil in the main reservoir is heated by oil returning from the bearings and the drain tank.

9 Claims, 2 Drawing Figures

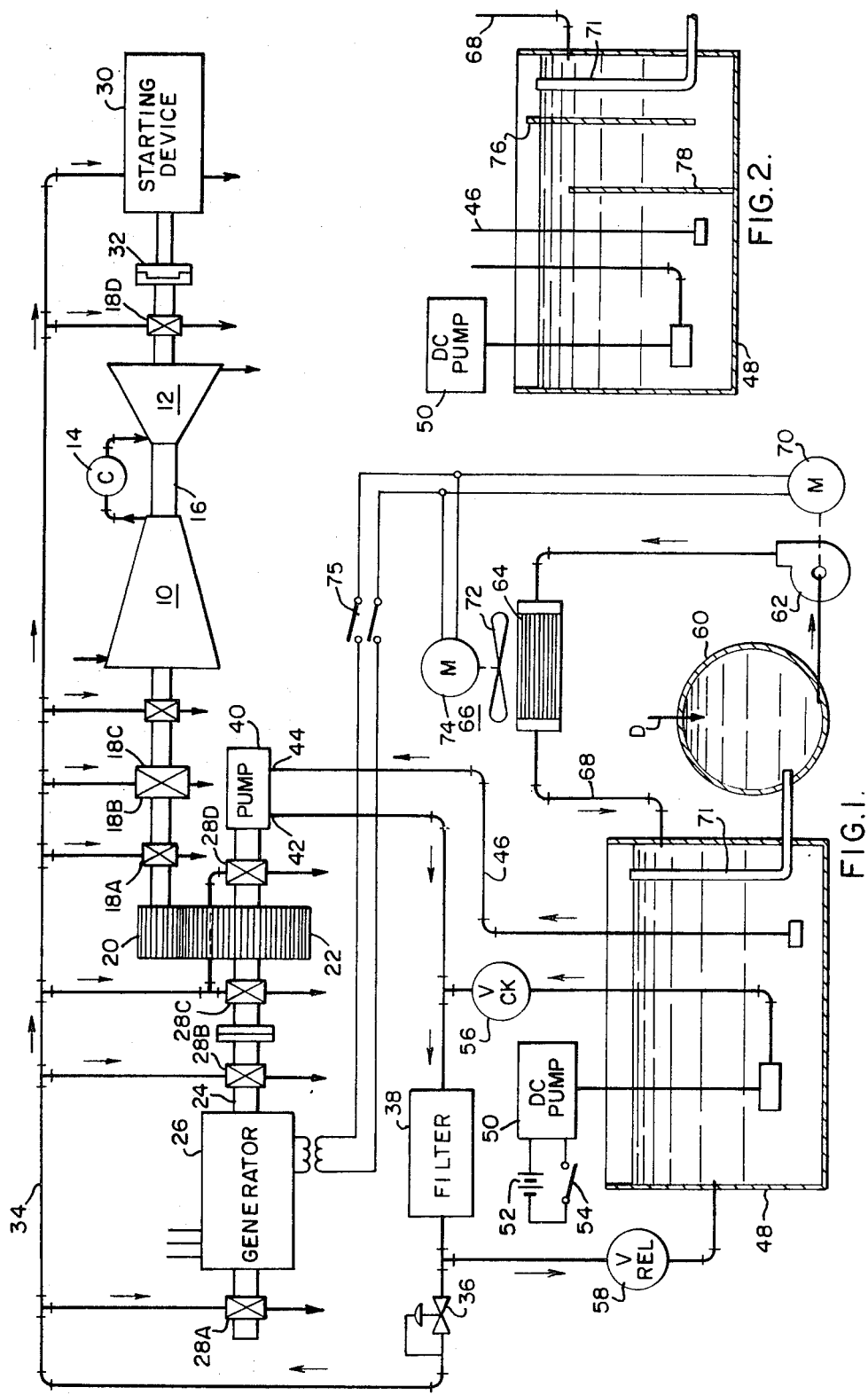

3,658,153

LUBRICATING OIL SYSTEM FOR A PRIME MOVER

BACKGROUND OF THE INVENTION

In the usual lubricating oil system for an internal combustion prime mover such as a gas turbine, hot oil from the turbine bearings is drained back to a reservoir from which it is pumped through a cooler, a filter and then back to the bearings. In turbine plants having no cooling water service, cooling is accomplished by means of an electrically driven fan in a heat exchanger arrangement.

In certain cases, it may become necessary to "black start" a gas turbine for driving an electrical generator, during which time no external electrical power is available to drive the fan for the oil cooler. A "black start" is necessary, for example, when a complete power distribution network becomes overloaded, causing the main circuit breakers for the generators feeding the network to trip. When this occurs, the load is removed from a turbine driving a generator; and if the turbine is not shut down, it will tend to overspeed. Consequently, the controls for the turbine shut it down also. It then becomes necessary to restart the turbine, but this is not a simple matter. Gas turbine power plants, like reciprocating internal combustion engines, require an external source of cranking power for starting; but unlike reciprocating internal combustion engines must be cranked to a relatively high speed, on the order of about 45 percent of normal speed, before they become self-sustaining and run under their own power. Furthermore, additional running time is usually required before the main circuit breaker on the generator can be again closed and a load imposed on the turbine.

In most turbines, the main oil pump for the lubricating system is driven from the shaft of the turbine itself; however if hot oil from the reservoir is pumped back through the cooling apparatus and then to the bearings, and if the cooling apparatus is not operating by virtue of a lack of electrical power, the hot oil will enter the bearings and possibly cause damage to the turbine. As a result, in many gas turbine plants having no cooling water service, where electrically powered fans are used to cool the oil, the turbine cannot be started if no power is available to drive the fans, at least not until the hot oil in the reservoir cools.

SUMMARY OF THE INVENTION

As an overall object, the present invention provides a means for lubricating a gas turbine under "black start" conditions by maintaining a supply of cool oil in the reservoir for the lubricating system at all times, at least under normal operating conditions. This supply of cool oil can then be pumped through a filter to the turbine bearings to accommodate one or more "black starts" without the necessity for cooling the oil with an external source of electrical power.

Briefly, the foregoing object is accomplished in accordance with the invention by initially draining the hot oil from the turbine bearings into a drain tank rather than into the reservoir as in prior art systems. Under normal operating conditions, with a source of electrical power available, the hot oil in the drain tank is pumped by an electrically driven pump through a heat exchanger cooled by an electrically driven fan and then into the reservoir from whence it is pumped by a pump coupled to the turbine shaft through a filter and back to the bearings.

Under "black start" conditions, no power is available to drive the electrically driven pump or the cooling fan. As will be understood, this could cause the drain tank to become completely filled and create a back pressure situation in the lubricating oil system if no means were provided to alleviate the condition. Therefore, a large diameter overflow conduit interconnects the drain tank and the reservoir such that when the volume of oil fed into the drain tank exceeds a predetermined limit without being pumped out (as under "black start" conditions), the oil in the drain tank will overflow into the reservoir where this warmer oil becomes mixed with a larger volume of cooler oil.

Preferably, the overflow conduit from the drain tank feeds into one end of the reservoir, while cool oil is drawn out of the other end. This minimizes the effect of increasing the temperature of the oil pumped into the bearings due to infusion of the warm oil from the drain tank directly into the reservoir. Furthermore, baffles are advantageously interposed in the reservoir between the drain tank overflow and the cool oil suction pipe to minimize admixing between the cool and hot oils.

The above and other objects and features of the invention will become apparent from the following detailed description taken in connection with the accompanying drawings which form a part of this specification, and in which:

DESCRIPTION OF THE PREFERRED EMBODIMENTS

FIG. 1 is a schematic illustration of the gas turbine lubricating system of the invention; and FIG. 2 illustrates an alternative embodiment of the drain tank for the system of FIG. 1 utilizing baffles between the hot oil input and the cool oil suction pipe.

With reference now to the drawings, and particularly to FIG. 1, there is shown a power plant of the gas turbine type comprising a compressor portion 10, a gas turbine portion 12 and a fuel combustion chamber 14 interposed between the compressor 10 and the turbine 12. The compressor 10 and turbine 12 are provided with rotor structures, not shown, connected to each other by a shaft 16. Fuel is injected into the combustion chamber 14 from a suitable fuel supply, not shown, by a fuel control mechanism. Air enters the compressor 10, is compressed, and is then fed to the combustion chamber 14 where it is mixed with the fuel and ignited, the gaseous combustion products being directed against blades of the rotor structure in the turbine 12, causing the shaft 16 to turn.

The shaft 16, which may be of one continuous length or formed in sections, is supported in suitable bearings 18A, 18B, 18C and 18D. At one end of the shaft 16 is a pinion gear 20 which meshes with gear 22 keyed to the shaft 24 for an electrical generator 26. The shaft 24, like shaft 16, is supported in suitable bearings 28A, 28B, 28C and 28D.

As was explained above, in order to start a turbine of the type shown in FIG. 1, an external source of cranking power is required to rotate the turbine to a speed of about 45% of its normal speed before it can run on its own power. In FIG. 1, the starting device is indicated generally by the reference numeral 30 and may, for example, comprise a diesel engine. The starting device 30 is adapted to be coupled to the shaft 16 through a clutch 32 which is a slip-type coupling such as a hydraulic or pneumatic torque converter. A slip-type coupling of this type is required since, in order to develop the torque required to accelerate the turbine from rest, the speed of the starting device (i.e., a diesel engine) must be well above its minimum idle speed. Accordingly, a clutch which does not provide for slippage would not be satisfactory.

Oil is supplied to the bearings for the shafts 16 and 24 as well as the starting device 30 through a conduit 34. The conduit 34, in turn, is connected through a pressure regulator 36 and a filter 38 to a pump 40 driven by the shaft 24. The pump 40 is provided with an output port 42 connected to the filter 38 and an input port 44 connected through a conduit 46 to an oil reservoir 48. In parallel with the pump 40 is a direct current pump 50 driven by a source of direct current potential, such as battery 52, which is adapted to be connected to the pump 50 through switch 54. The direct current pump 50, when the switch 54 is closed, can pump oil through a check valve 56 to the filter 38. However, the check valve 56 will prevent a reverse flow of oil from the output port 42 of pump 40. A relief valve 58 connects the output port of the filter 38 back to the reservoir 48 such that if the pressure in conduit 34 exceeds a predetermined limit, the relief valve 58 will bleed off oil back to the reservoir 48.

The oil, as it is pumped through the bearings 18A–18D and 28A–28D, is heated. The heated oil is then drained into a drain tank 60, as indicated by the arrow D, from where it is pumped by means of pump 62 through the heat exchanger 64 of an oil cooler 66. After passing through the heat exchanger 64, the oil is then fed back into the reservoir 48 through conduit 68.

The pump 62 is driven by means of an alternating current motor 70. Similarly, the fan 72 for the oil cooler 66 is driven by a second alternating current motor 74. The two motors 70 and 74 are adapted to be connected through switch 75 to the generator 26, or another source of alternating current power.

Under normal operation conditions with the turbine operating at its rated speed, the pump 40 will pump oil from the reservoir 48 through the filter 38, the pressure regulator 36 and conduit 34 to the turbine bearings. The heated oil is then returned to the drain tank 60 where it is pumped by pump 62 through the oil cooler 66 and back to the reservoir 48. In this manner, a supply of cool oil is maintained in the reservoir 48 at all times. Now, if it is assumed that an entire electrical power network becomes overloaded to the point where the main circuit breaker on the generator 26 trips, as well as the breakers on other generators in the power distribution network, the controls for the internal combustion turbine will cause it to shut down to prevent an overspeed condition as the load is removed from its output shaft. It then becomes necessary to restart the turbine with the use of the starting device 30; however before the turbine can be started, a supply of cool oil must be pumped through the bearings for shafts 16 and 24. This is accomplished initially by means of the direct current pump 50 which pumps the cool oil from the reservoir 48 through the check valve 56 until the turbine reaches a speed where the pump 40 can deliver oil of sufficient pressure to the bearings. At this time, with no power available to drive the pump 62 or the fan motor 74, the hot oil from the bearings will simply drain into the drain tank 60 without being pumped out by the pump 62.

Note that the drain tank 60 is connected through a large diameter conduit 71 to the reservoir 48. The conduit 71 terminates at a point just above the normal level of the oil in the reservoir 48. With this arrangement, and after a predetermined volume of oil is drained into the drain tank 60 without being pumped out by pump 62, the oil in the drain tank 60 will overflow into the reservoir 48. This oil, of course, will be hot and will tend to increase the temperature of the oil in the reservoir 48 which is being pumped to the turbine bearings. However, the volume of the cool oil in the reservoir 48 is sufficient such that several "black starts" of the turbine can be accomplished before the oil temperature in the reservoir 48 rises to the point where it cannot be tolerated. Of course, once the turbine reaches its rated speed and the generator 26 is again connected to its load, the motors 70 and 74 can be restarted and the normal cycle initiated.

In FIG. 2, an alternative embodiment of the reservoir 48 is shown. Elements in FIG. 2 which correspond to those in FIG. 1 are identified by like reference numerals. In this case, however, baffles 76 and 78 are interposed between the large diameter conduit and the intake for conduit 46 leading to the input port of pump 40. The baffles 76 and 78 act to prevent rapid mixing of the hot oil entering the reservoir 48 through the conduit 71 with the cool oil which is in the left side of the reservoir. Thus, with the arrangement shown in FIG. 2, the temperature of the oil pumped to the bearings under "black start" conditions will not increase in temperature as rapidly as it will in the embodiment of FIG. 1 where no baffles are employed.

It will be noted that if the pump 62 has a greater capacity than the pump 40 or pump 50, then it will pump the drain tank 60 dry. To prevent this, the oil level in tank 48 and the top of the overflow pipe 71 can be matched so that as oil is pumped from tank 60 to reservoir 48, the oil level in tank 48 will rise if the capacity of pump 62 is greater than that of pump 40 or pump 50. Before the tank 60 is pumped dry and the pump 62 starts to cavitate, oil will overflow through pipe 71 back into the drain tank 60 and thereby prevent loss of oil to the suction side of pump 62. This is an important feature since it eliminates the need for level controls in overflow tank 60 and, in addition, does not demand exact matching of the capacities of the several pumps.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a lubricating system for a turbine of the type wherein oil is pumped from a reservoir through bearings for the turbine and thence back to the reservoir; the combination of electrically powered cooling means for normally cooling oil as it is pumped from the bearings back to said reservoir, a drain tank into which oil from said bearings flows before it is pumped through the cooling means back to the reservoir, overflow conduit means interconnecting said drain tank with said reservoir whereby oil above a predetermined volume flowing into said drain tank without being pumped through said cooling means will be forced through the overflow conduit means back to the reservoir, an oil pump coupled to and driven by the shaft of said turbine for normally pumping oil from said reservoir to said bearings, and a separately driven pump in parallel with said shaft-driven pump for pumping oil to said bearings before the turbine has reached a speed where the shaft-driven pump can deliver oil under sufficient pressure to said bearings.

2. The combination of claim 1 including an oil filter interposed between said shaft-driven pump and said bearings.

3. In a lubricating system for a turbine of the type wherein oil is pumped from a reservoir through bearings for the turbine and thence back to the reservoir; the combination of electrically powered cooling means for normally cooling oil as it is pumped from the bearings back to said reservoir, a drain tank into which oil from said bearings flows before it is pumped through the cooling means back to the reservoir, overflow conduit means interconnecting said drain tank with said reservoir whereby oil above a predetermined volume flowing into said drain tank without being pumped through said cooling means will be forced through the overflow conduit means back to the reservoir, said overflow conduit terminating in said reservoir just above the normal liquid level of oil therein and at least a portion of said drain tank being disposed below the normal liquid level in said reservoir.

4. In a lubricating system for a turbine of the type wherein oil is pumped from a reservoir through bearings for the turbine and thence back to the reservoir; the combination of electrically powered cooling means for normally cooling oil as it is pumped from the bearings back to said reservoir, a drain tank into which oil from said bearings flows before it is pumped through the cooling means back to the reservoir, overflow conduit means interconnecting said drain tank with said reservoir whereby oil above a predetermined volume flowing into said drain tank without being pumped through said cooling means will be forced through the overflow conduit means back to the reservoir, said overflow conduit terminating in said reservoir just above the normal liquid level of oil therein, said overflow conduit entering the side of said reservoir and terminating above the normal liquid level of oil in the reservoir at said one side thereof, and baffles interposed between said overflow conduit and a suction conduit for oil being pumped to said bearings, whereby said baffles will impede mixing of hot oil entering the reservoir from said drain tank with the cooler on the side of the baffles opposite the overflow conduit.

5. In a lubricating system, a turbine having a driving shaft and bearings therefor, an oil reservoir adapted to contain oil for said bearings and a shaft driven pump associated with said reservoir and effective to pump said oil from said reservoir through said bearings, whereby said oil is heated, a drain tank, means for directing the heated oil from said bearings to said drain tank, means including a first separately driven pump associated with said tank for pumping the heated oil from the drain tank to the reservoir during normal operation, and a second separately driven pump associated with said reservoir for pumping oil from said reservoir during the start-up period of the turbine wherein the shaft driven pump is ineffective to pump oil from said reservoir to said bearings.

6. The lubricating system recited in claim 5 and further including overflow conduit means interconnecting the drain tank and the reservoir in bypass relation with the first separately driven drain pump, whereby oil above a predetermined volume flowing into the drain tank will be forced through said one flow conduit means back into the reservoir when the first separately driven pump is not in operation.

7. The system recited in claim 5 and further including cooling means for cooling the oil when the first separately driven pump is energized in normal operation of the turbine.

8. The system recited in claim 7, wherein the cooling means is energized by the turbine.

9. The system recited in claim 5 wherein at least a portion of the drain tank is below the normal liquid level in the reservoir.

* * * * *